US009837080B2

(12) United States Patent
Aronowitz et al.

(10) Patent No.: US 9,837,080 B2
(45) Date of Patent: Dec. 5, 2017

(54) DETECTION OF TARGET AND NON-TARGET USERS USING MULTI-SESSION INFORMATION

(71) Applicant: International Business Machines Corporation, Armonk, NY (US)

(72) Inventors: Hagai Aronowitz, Petah-Tikva (IL); Shay Ben-David, Haifa (IL); David Nahamoo, Great Neck, NY (US); Jason W. Pelecanos, Ossining, NY (US); Orith Toledo-Ronen, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 14/465,415

(22) Filed: Aug. 21, 2014

(65) Prior Publication Data
US 2016/0055844 A1 Feb. 25, 2016

(51) Int. Cl.
*G10L 17/06* (2013.01)

(52) U.S. Cl.
CPC .................................. *G10L 17/06* (2013.01)

(58) Field of Classification Search
None
See application file for complete search history.

(56) References Cited

U.S. PATENT DOCUMENTS

| | | | |
|---|---|---|---|
| 7,869,578 B2 | 1/2011 | Evans et al. | |
| 8,442,824 B2 | 5/2013 | Aley-Raz et al. | |
| 8,447,592 B2 | 5/2013 | Edgington et al. | |
| 2011/0224986 A1* | 9/2011 | Summerfield | G10L 17/12 704/246 |
| 2012/0254243 A1* | 10/2012 | Zeppenfeld | H04M 15/47 707/778 |

(Continued)

OTHER PUBLICATIONS

H. Meng et al., "The Multi-Biometric, Multi-Device and Multilingual (M3) Corpus," Poster Session #1, Second International Workshop on Multimodal User Authentication, May 2006, 8 pages, Toulouse, France.

(Continued)

*Primary Examiner* — Marivelisse Santiago Cordero
*Assistant Examiner* — Keara Harris
(74) *Attorney, Agent, or Firm* — Yeen Tham; Ryan, Mason & Lewis, LLP

(57) ABSTRACT

Systems and methods for maintaining speaker recognition performance are provided. A method for maintaining speaker recognition performance, comprises training a plurality of models respectively corresponding to speaker recognition scores from a plurality of speakers over a plurality of sessions, and using the plurality of models to conclude whether a speaker seeking access to an environment is a non-ideal target speaker or a non-ideal non-target speaker. Using the plurality of models to conclude comprises calculating a first probability that the speaker seeking access is the non-ideal target speaker, calculating a second probability that the speaker seeking access is the non-ideal non-target speaker, and determining whether the first probability, the second probability or a sum of the first probability and the second probability is above a probability threshold.

20 Claims, 5 Drawing Sheets

(56) References Cited

U.S. PATENT DOCUMENTS

2013/0095959 A1 4/2013 Marty et al.
2013/0132091 A1 5/2013 Skerpac

OTHER PUBLICATIONS

N. Houmani et al., "A Novel Personal Entropy Measure Confronted with Online Signature Verification Systems' Performance," 2nd IEEE International Conference on Biometrics: Theory, Applications and Systems (BTAS), 2008, 6 pages.

Jeremiah Remus, "Advanced Subspace Techniques for Modeling Channel and Session Variability in a Speaker Recognition System," Final Technical Report, AFRL-RI-RS-TR-2012-085, Clarkson University, Mar. 2012, 46 pages.

Javier Rodríguez Saeta, "Decision Threshold Estimation and Model Quality Evaluation Techniques for Speaker Verfiication," Dissertation, Universitat Politècnica de Catalunya, Jun. 2005, 154 pages.

T. Wade et al., "Effects of Acoustic Variability in the Perceptual Learning of Non-Native-Accented Speech Sounds," Phonetica, Jul. 2007, 23 pages.

J. Koolwaaij et al., "On Model Quality and Evaluation in Speaker Verification," IEEE International Conference on the Acoustics, Speech, and Signal Processing (ICASSP), Jun. 2000, pp. 3759-3762, vol. 6, Istanbul, Turkey.

J.W. Koolwaaij et al., "A New Procedure for Classifying Speakers in Speaker Verification Systems," Fifth European Conference on Speech Communication and Technology (EUROSPEECH), Sep. 1997, 4 pages, Rhodes, Greece.

J. Thompson et al., "The Pre-Detection of Error-Prone Class Members at the Enrollment Stage of Speaker Recognition Systems," ESCA Workshop on Automatic Speaker Recognition, Identification, and Verification (ASRIV), Apr. 1994, pp. 127-130, Martigny, Switzerland.

G. Doddington et al., "Sheep, Goats, Lambs and Wolves, A Statistical Analysis of Speaker Performance in the NIST 1998 Speaker Recognition Evaluation," 5th International Conference on Spoken Language Processing (ICSLP), incorporating the 7th Australian International Speech Science and Technology Conference, Nov.-Dec. 1998, 4 pages, Sydney, Australia.

R. Bolton et al., "Unsupervised Profiling Methods for Fraud Detection," Proceedings of Credit Scoring and Credit Control VII, 2001, 16 pages.

O. Toledo-Ronen et al., "Towards Goat Detection in Text-Dependent Speaker Verification," 12th Annual Conference of the International Speech Communication Association (INTERSPEECH), Aug. 2011, pp. 9-12, Florence, Italy.

N. Poh et al., "A Methodology for Separating Sheep from Goats for Controlled Enrollment and Multimodal Fusion," Biometrics Symposium (BSYM), Sep. 2008, pp. 17-22.

whatis.com, "What is goat?—Definition from WhatIs.com," http://searchsecurity.techtarget.com/definition/goat, Jul. 2014, 11 pages.

Wikipedia, "Heuristic," http://en.wikipedia.org/wiki/Heuristic, Jul. 2014, 8 pages.

\* cited by examiner

200

300

DETECTION OF TARGET AND NON-TARGET USERS USING MULTI-SESSION INFORMATION

TECHNICAL FIELD

The field generally relates to systems and methods for maintaining speaker recognition performance and, in particular, to systems and methods for detecting target and non-target users based on multiple verification sessions for a user.

BACKGROUND

In speaker or voice recognition, goats can refer to authorized end-users that are prevented from accessing a system because their biometric data pattern (e.g., speech pattern) is not within a range that is recognized by the system. For example, goats can be speakers with poor quality biometric models that result in a lack of success at being accepted into a system. Wolves can refer to unauthorized end-users that compare well with target biometric models, and are granted access to a system. In other words, wolves can refer to speakers that are successful at impersonating the biometric characteristics required for access to a system. See, e.g., G. Doddington et al., "SHEEP, GOATS, LAMBS and WOLVES: A Statistical Analysis of Speaker Performance in the NIST 1998 Speaker Recognition Evaluation", in Proc. ICSLP, 1998.

In order to ensure adequate performance of a speaker recognition system, goats and wolves should be properly identified.

SUMMARY

In general, exemplary embodiments of the invention include systems and methods for maintaining speaker recognition performance and, in particular, to systems and methods for detecting target and non-target users based on multiple verification sessions for a user.

According to an exemplary embodiment of the present invention, a method for maintaining speaker recognition performance, comprises training a plurality of models respectively corresponding to speaker recognition scores from a plurality of speakers over a plurality of sessions, and using the plurality of models to conclude whether a speaker seeking access to an environment is a non-ideal target speaker or a non-ideal non-target speaker. Using the plurality of models to conclude comprises calculating a first probability that the speaker seeking access is the non-ideal target speaker, calculating a second probability that the speaker seeking access is the non-ideal non-target speaker, and determining whether the first probability, the second probability or a sum of the first probability and the second probability is above a probability threshold. The method further includes restricting the speaker seeking access from accessing the environment upon determining that the first probability, second probability or the sum of the first probability and the second probability is above the probability threshold.

According to an exemplary embodiment of the present invention, a system for maintaining speaker recognition performance, comprises a training module capable of training a plurality of models respectively corresponding to speaker recognition scores from a plurality of speakers over a plurality of sessions, and an analysis module capable of using the plurality of models to conclude whether a speaker seeking access to an environment is a non-ideal target speaker or a non-ideal non-target speaker. The analysis module is further capable of calculating a first probability that the speaker seeking access is the non-ideal target speaker, calculating a second probability that the speaker seeking access is the non-ideal non-target speaker, and determining whether the first probability, the second probability or a sum of the first probability and the second probability is above a probability threshold. The system further includes an access module capable of restricting the speaker seeking access from accessing the environment upon determining by the analysis module that the first probability, second probability or the sum of the first probability and the second probability is above the probability threshold.

According to an exemplary embodiment of the present invention, a computer program product for maintaining speaker recognition performance, comprises a computer readable storage medium having program instructions embodied therewith, the program instructions executable by a processor to cause the processor to perform a method comprising training a plurality of models respectively corresponding to speaker recognition scores from a plurality of speakers over a plurality of sessions, and using the plurality of models to conclude whether a speaker seeking access to an environment is a non-ideal target speaker or a non-ideal non-target speaker. Using the plurality of models to conclude comprises calculating a first probability that the speaker seeking access is the non-ideal target speaker, calculating a second probability that the speaker seeking access is the non-ideal non-target speaker, and determining whether the first probability, the second probability or a sum of the first probability and the second probability is above a probability threshold. The method further includes restricting the speaker seeking access from accessing the environment upon determining that the first probability, second probability or the sum of the first probability and the second probability is above the probability threshold.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
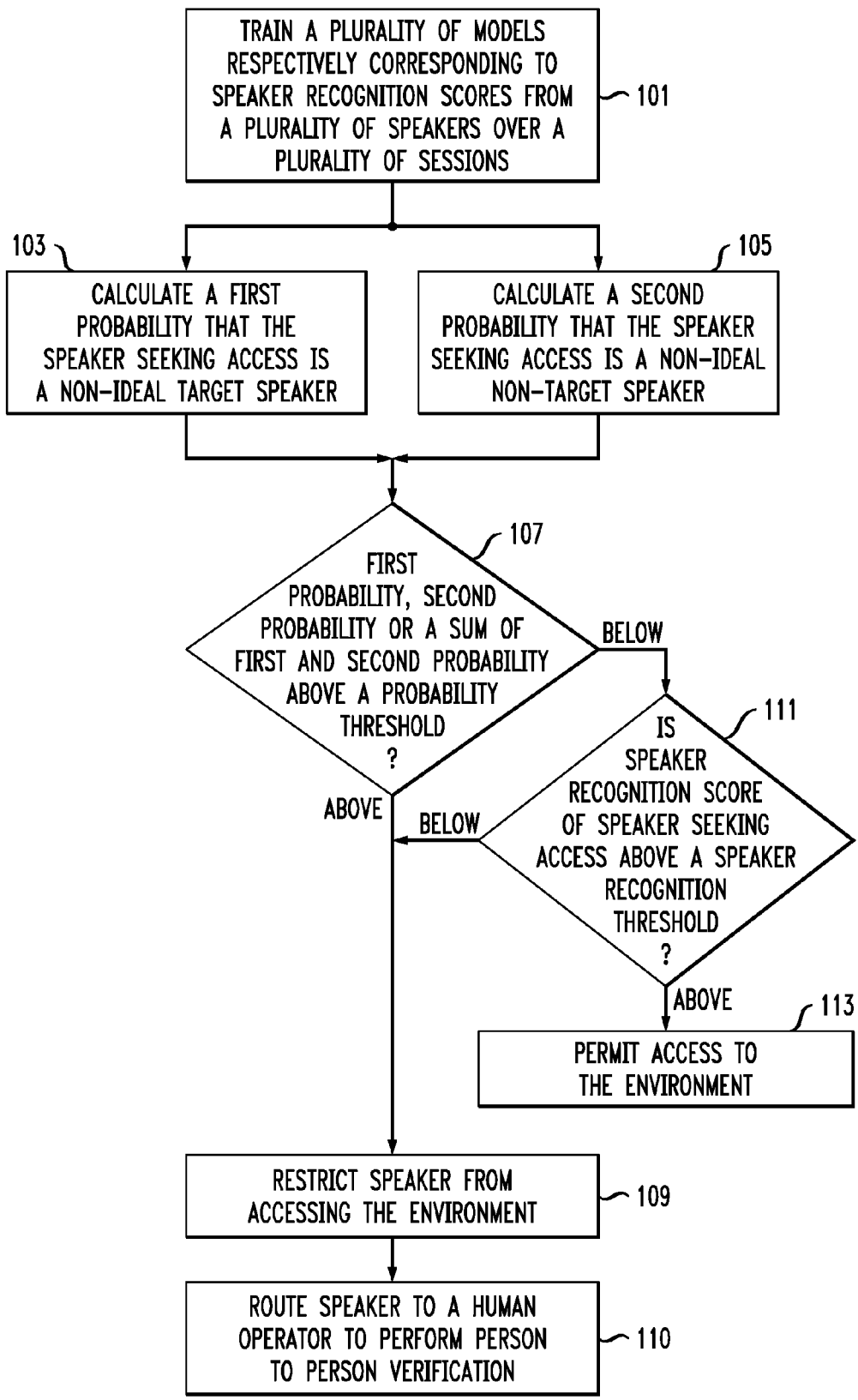
FIG. 1 is a flow diagram of a method for maintaining speaker recognition performance, according to an exemplary embodiment of the invention.

Exemplary embodiments of the invention will now be discussed in further detail with regard to systems and methods for maintaining speaker recognition performance and, in particular, to systems and methods for detecting target and non-target users based on multiple verification sessions for a user. This invention may, however, be embodied in many different forms and should not be construed as limited to the embodiments set forth herein.

When detecting goat target users and wolf non-target users, there are no known multiple session (also referred to herein as "multi-session") solutions that examine biometric information across a plurality of sessions.

As used herein, a "session" refers to a verification process for a user attempting to gain access to an environment. Examples of sessions include, but are not limited to, voice or speaker recognition trials where users provide samples of their voices to determine whether there is a match with a voice model on file for that particular user. The session may take place over any appropriate medium on which samples can be provided, for example, over a telephone or internet connection where a user can provide required samples. Sessions are not limited to examinations of voices, and may include examination of other biometric information, including but not limited to, face recognition, fingerprint recognition, eye/periocular based analysis, and other biometric measurements, such as those based on, for example, gait and ear shape. A session may also include capture of biometrics samples by a smartphone or other portable electronic device.

As used herein, "multiple sessions," "multi-sessions" or "a plurality of sessions" refer to more than one session.

As used herein, "call-in" or "call-in session" refers to a session where a user provides biometric information, such as voice information, over the telephone.

As used herein, "environments" can include, but are not limited to, physical and/or software-based locations and/or services to which a user seeks access, for example, secure services, such as automated call-in services and/or voice-activated web services for financial institutions, businesses, utilities, medical records, etc.

In the area of biometrics, the detection of goats and wolves has been considered as a single session, single decision challenge. Advantageously, embodiments of the present invention use information from multiple sessions to detect goats and wolves. While different features for goat detection have been considered in connection with single sessions, such single session analysis provides relatively limited benefit in contrast to multi-session analysis possibilities.

Banking and credit card entities may use purchase and related user history (e.g., longitudinal information) of a customer to determine unauthorized activity on a credit card. However, such techniques look at information outside of speaker related statistics, and have not been applied in the speaker recognition realm or in connection with the analysis of biometric information.

Accordingly, embodiments of the present invention provide systems and methods which are capable of detecting goats and wolves using biometric information from multiple sessions. Embodiments of the present invention address maintaining speaker recognition performance across a wide variety of speakers by identifying the presence of poor quality biometric models, and also provide a mechanism to determine unauthorized or non-target users that compare well enough with a target model to gain access to an environment (e.g., wolves). A poor quality biometric model may lead to authorized or target users being denied access to an environment (e.g., goats). Embodiments of the present invention take into account multiple sessions to determine ongoing problems with particular speakers being verified.

A system or method, in accordance with an embodiment of the present invention, detects speaker models that generally score poorly as targets (e.g., goat models), and detects speakers that score relatively well as non-targets (e.g., wolves). For a single session, it can be difficult to determine if a model has one of these two particular speaker classes. According to embodiments of the present invention, if multiple sessions or trials against the target model are taken into consideration, then the characteristics of a set of scores can be taken into consideration to recognize a goat or wolf. When examining a score distribution of a set of target trials for a typical model, it may be observed that the scores are typically well-separated from the scores of the impostor trials against the same model. A typical model can refer to, for example, a sheep model, including speakers with voice patterns that are easily accepted by a system. While it is likely that one or so trials may score poorly, the general trend is for the target scores to be relatively high.

In an Interactive Voice Response (IVR) system, a speaker verification hypothesis is accepted or rejected based on whether or not the speaker recognition score from the session exceeds or falls short of the designated accept/reject threshold (also referred to herein as a "speaker recognition threshold"). In terms of recognizing goat or wolf speakers, embodiments of the present invention include an operating region of scores close to the speaker recognition threshold that can indicate evidence of a goat or wolf speaker being present. In accordance with an embodiment of the present invention, if several sessions are observed that have scores close to an accept/reject threshold, then a goat/wolf may be using the IVR. For example, an embodiment of the present invention looks at speaker recognition statistics over more than one call, and identifies a potential problem if the speaker recognition scores are consistently close to an accept/reject threshold. Speaker recognition scores can be calculated by methods known to those of ordinary skill in the art, including, but not limited to, extracting speech statistics of a raw acoustic signal for comparison to a test signal, and using speech content that is incorporated into the score.

Embodiments of the present invention significantly reduce overall speaker recognition errors over time by analyzing the expected characteristics of typical speaker models, goats and wolves. Consequently, detecting goats and wolves, in accordance with embodiments of the present invention, can significantly improve user experience and cut fraud.

Embodiments of the present invention take into account that goats and wolves produce scores that can be relatively marginal. More specifically, goats are target speakers that produce scores for target trials that are marginally lower than a speaker recognition threshold, while wolves are non-target speakers that produce scores marginally higher than a speaker recognition threshold for a particular speaker or speakers. To detect goats and wolves, embodiments of the present invention build models of typical scores expected by the goats and wolves. According to an embodiment, the models of the typical scores are obtained by analyzing multiple sessions for a particular model so that evidence for detecting a goat or wolf can be accumulated.

In accordance with an embodiment of the present invention, a user (e.g., a person) enrolls in a speaker verification system with a human operator and/or by responding to automated queries. The user provides a sample of their voice over a predetermined period of time (e.g., 30 seconds) and, using the voice sample, a voice model is constructed and stored for that user as part of or after the enrollment process. The model includes gathered acoustics information (e.g., gathered during enrollment) and is a representation of what a user sounds like. In accordance with an embodiment, model quality estimation techniques may be used to confirm that the model was registered appropriately and will be a well-performing model.

When a user engages (e.g., calls-in to) the speaker verification system, the user's voice is compared with the voice model, and a speaker recognition score is determined. If the speaker recognition score is relatively high (e.g., well-above a speaker recognition threshold score required for obtaining access to the system), it is more likely that the user who calls in is a target person (e.g., person who enrolled) and access can be granted to, for example, allow a transaction to be performed. Whether access is granted can also be based on account risk characteristics, such as for example, whether an account is a high or low security risk. On the other hand, when the speaker recognition score is relatively low (e.g., well-below a speaker recognition threshold score), it may be more likely that the user who calls in is not a target person (e.g., an impostor) and access can be denied.

Referring to FIG. 1, which illustrates a method 100 for maintaining speaker recognition performance, in accordance with an embodiment of the present invention, at block 101, a plurality of models respectively corresponding to speaker recognition scores from a plurality of speakers over a plurality of sessions are trained. The plurality of speakers comprise, for example, known non-ideal target speakers, known non-ideal non-target speakers, ideal target speakers and ideal non-target speakers.

At blocks 103, 105 and 107, the plurality of models are used to conclude whether a speaker seeking access to an environment is a non-ideal target speaker or a non-ideal non-target speaker. Specifically, at block 103, a first probability that the speaker seeking access is the non-ideal target speaker is calculated, and at block 105, a second probability that the speaker seeking access is the non-ideal non-target speaker is calculated. Calculating the first and second probabilities comprises using speaker recognition scores for the models corresponding to the known non-ideal target speakers and the known non-ideal non-target speakers. Calculating the first and second probabilities can be performed using equations (1) and (2) discussed further below in connection with FIG. 2, where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

At block 107, it is determined whether the first probability, the second probability or a sum of the first probability and the second probability is above a probability threshold. The probability threshold refers to a predetermined level that a probability or sum of probabilities is to exceed before determining whether a speaker is restricted access to an environment. If the first probability, second probability or the sum of the first probability and the second probability is above the probability threshold, the method proceeds to block 109 where the speaker seeking access is restricted from accessing the environment, and to block 110 where the speaker seeking access is routed to a human operator to perform person to person verification. If each of the first probability, second probability and the sum of the first probability and the second probability are below the probability threshold, the method proceeds to block 111 where a speaker recognition score of the speaker seeking access is checked against a speaker recognition threshold, and to block 113 where access to the environment is permitted if the speaker recognition score is above the speaker recognition threshold. If the speaker recognition score is below the speaker recognition threshold, the method proceeds to block 109.

Figure 2:
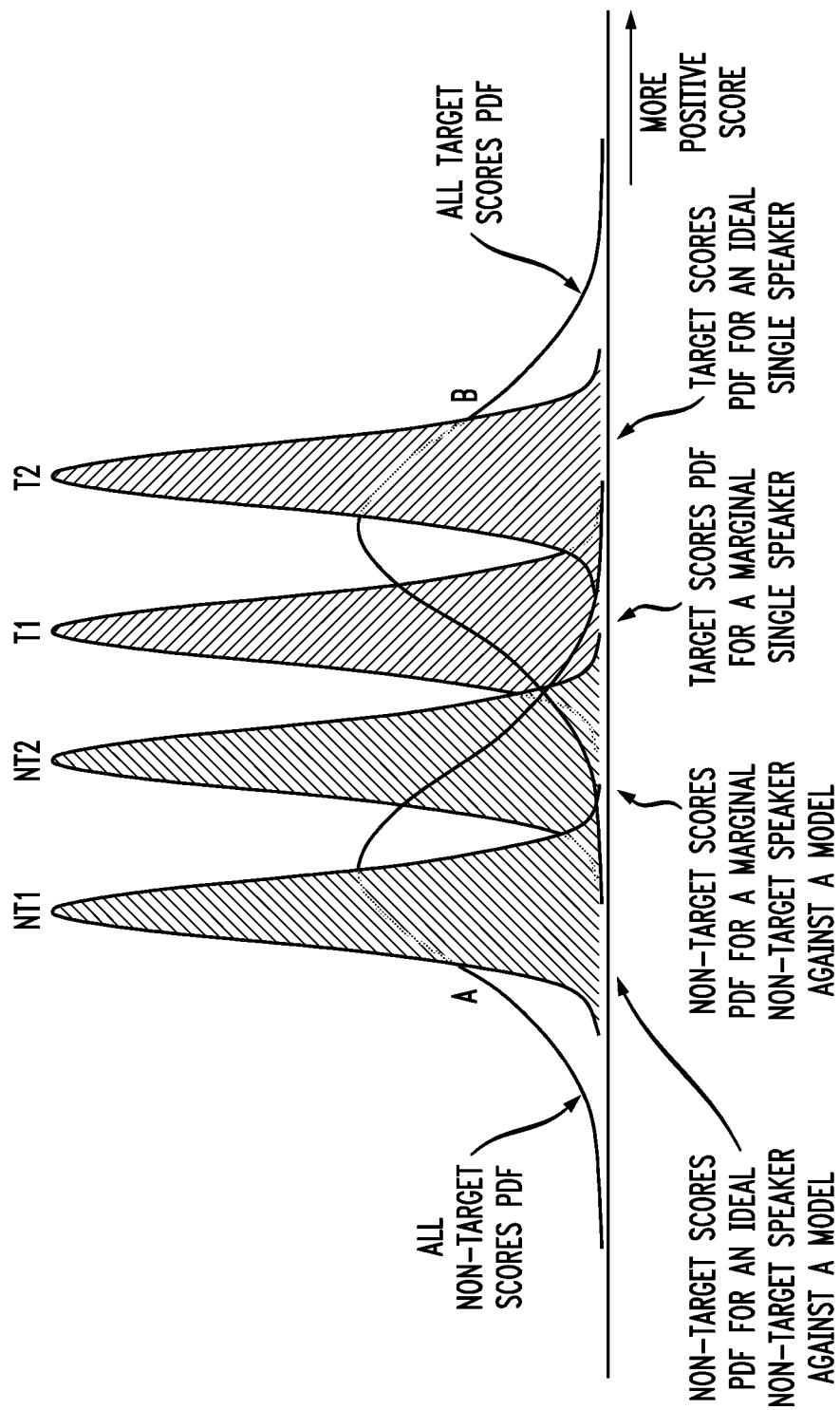
FIG. 2 is a graph illustrating score distributions, according to an exemplary embodiment of the invention.

Referring to FIG. 2, which is a graph 200 illustrating score distributions, in accordance with an embodiment of the present invention, the portions NT1 and NT2 represent the distribution of non-target trials separated into score distributions for ideal non-target speakers (e.g., ideal impostors) and marginal (non-ideal) non-target speaker (e.g., wolves). The portions T1 and T2 represent the distributions of the target scores separated into marginal (non-ideal) target speakers (e.g., goats) and ideal target speakers (e.g., ideal non-impostors). In FIG. 2, the results are modeled by describing the probability density function (PDF) of the scores. These distributions can be represented by a single Gaussian, a Gaussian mixture model or some other statistical mechanism. According to an embodiment, detecting a goat or a wolf could also be represented as a discriminative model. Curves A and B in FIG. 2 represent the PDFs of all non-target and all target scores, respectively.

As shown in FIG. 2, there are four core distributions of interest. From left to right they are: (1) the PDF for ideal non-target trials p(S|ideal nontarget) (NT1), (2) the PDF for marginal (e.g., non-ideal) non-target trials (e.g., impostor trials from wolves) p(S|wolf) (NT2), (3) the PDF for marginal (e.g., non-ideal) target trials (target trials from goats) p(S|goat) (T1), and (4) the PDF for ideal target trials p(S|ideal target) (T2).

In accordance with Bayes' Theorem, the probability of finding a goat for a single score can be calculated as follows in equation (1):

$$p(\text{goat}|S) = \frac{P(\text{goat})p(S|\text{goat})}{P(\text{ideal nontarget})p(S|\text{ideal nontarget}) + P(\text{goat})p(S|\text{goat}) + P(\text{wolf})p(S|\text{wolf}) + P(\text{ideal target})p(S|\text{ideal target})} \quad (1)$$

where P(ideal nontarget) is the prior probability of an ideal impostor, P(goat) is the prior probability of a goat, P(wolf) is the prior probability of a wolf, and P(ideal target) is the prior probability of an ideal target speaker.

Similarly, the probability of finding a wolf for a single score can be calculated as follows in equation (2):

$$p(\text{wolf}|S) = \frac{P(\text{wolf})p(S|\text{wolf})}{P(\text{ideal nontarget})p(S|\text{ideal nontarget}) + P(\text{goat})p(S|\text{goat}) + P(\text{wolf})p(S|\text{wolf}) + P(\text{ideal target})p(S|\text{ideal target})} \quad (2)$$

The probabilities represent how often the entities, such as the ideal impostor, goat, wolf and ideal target, have appeared and/or are expected to appear. Ideal targets and ideal impostors typically have scores well away from a threshold.

If there are N scores available, denoted as the set of scores $S=\{s_i\}_{i=1, 2, \ldots, N}$, the probability of the goat given multiple independent scores from the same class can be calculated from equation (1) once again by estimating the joint likelihood of the scores given the speaker category.

Specifically, p(S|goat) is calculated as $p(S|\text{goat}) = \prod_{i=1}^{N} p(s_i|\text{goat})$. The likelihoods of the score sets given the other classes are calculated in a similar manner, for example $p(S|\text{wolf}) = \prod_{i=1}^{N} p(s_i|\text{wolf})$. In addition, the probabilities can be calculated for other speaker classes (such as, for example, typical impostors and targets, and wolves).

In accordance with an embodiment of the present invention, this joint likelihood calculation assumes that all observations are either from the goat, the wolf, the ideal target, or the ideal non-target. If this approach is not appropriate for the application, a set of heuristics can be chosen instead. Specifically, the system can decide if the trials are problematic (a goat or wolf) or satisfactory (a target or non-target). For example, if three of the last five scores are found to be close to the accept/reject threshold, then the system may need to flag the particular speaker model and corresponding sessions for review.

According to an embodiment, the probabilities are combined into an estimate of the cost of the risk and compared against a threshold to determine the speaker class.

In accordance with an embodiment of the present invention, a procedure for detecting a goat or wolf includes training four Gaussian Mixture Models, for example, on the scores from (1) known goat speakers, (2) known wolf speakers, (3) ideal non-target trials, and (4) ideal target trials; and using these four models to detect goat and wolf speakers.

In an illustrative example, for a speaker who is currently calling in and wants to be verified, the probability of a goat/wolf is calculated given the scores (P(goat|S) and P(wolf|S)) available to date for that speaker model. If P(goat|S) or P(wolf|S) (or the sum of the two) is above an acceptable threshold, then the call is passed on to a human operator to investigate further. Otherwise, if P(goat|S) or P(wolf|S) (or the sum of the two) is below an acceptable threshold, then the speaker recognition score is checked against a threshold for the purpose of speaker recognition, and the appropriate request by the client calling in is permitted.

In some instances, while this technique may be useful for detecting goats and wolves, it may be difficult to separate the properties of these two classes based on score distributions. Therefore, other mechanisms such as, for example, calling back a legitimate user to confirm a purchase request can be an appropriate follow-up measure.

Figure 3:
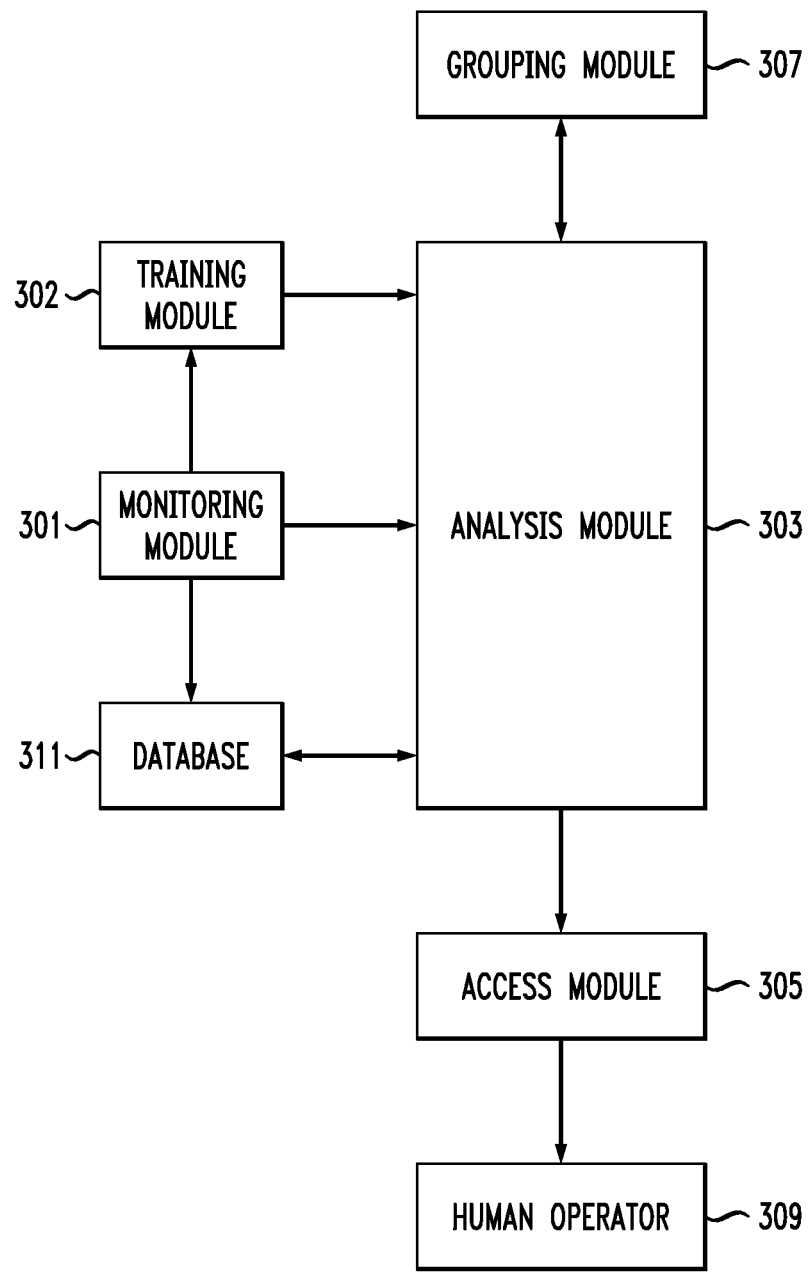
FIG. 3 is high-level diagram showing detail of a system for maintaining speaker recognition performance, according to an exemplary embodiment of the invention.

FIG. 3 illustrates a system 300 for maintaining speaker recognition performance, in accordance with an embodiment of the present invention. The system 300 includes a monitoring module 301 capable of monitoring a plurality of speaker recognition scores respectively corresponding to a plurality of sessions for a plurality of speakers/users, a training module 302 capable of training a plurality of models respectively corresponding to speaker recognition scores from a plurality of speakers over a plurality of sessions, an analysis module 303, and an access module 305 capable of restricting a speaker/user from accessing an environment. The speaker recognition scores and/or analysis results can be recorded in, for example, a database 311.

In accordance with an embodiment, the analysis module 303 is capable of using the plurality of models to conclude whether a speaker seeking access to an environment is a non-ideal target speaker or a non-ideal non-target speaker. More specifically, the analysis module 303 is capable of calculating a first probability that the speaker seeking access is the non-ideal target speaker, calculating a second probability that the speaker seeking access is the non-ideal non-target speaker, and determining whether the first probability, the second probability or a sum of the first probability and the second probability is above a probability threshold.

According to an embodiment, the access module 305 is capable of restricting the speaker seeking access from accessing the environment upon determining by the analysis module 303 that the first probability, second probability or the sum of the first probability and the second probability is above the probability threshold. The access module 305 is further capable of routing the speaker seeking access to a human operator to perform person to person verification upon determining by the analysis module that the first probability, second probability or the sum of the first probability and the second probability are above the probability threshold.

The analysis module 303 is further capable of calculating the first and second probabilities by using speaker recognition scores for the models corresponding to the known non-ideal target speakers and the known non-ideal non-target speakers, and of calculating the first and second probabilities using the equations (1) and (2), respectively, discussed in connection with FIG. 2. The analysis module 303 is also capable of checking a speaker recognition score of the speaker seeking access against a speaker recognition threshold upon determining that none of the first probability, second probability and the sum of the first probability and the second probability are above the probability threshold, and the access module 305 is further capable of permitting access to the environment if the speaker recognition score is above the speaker recognition threshold.

Figure 4:
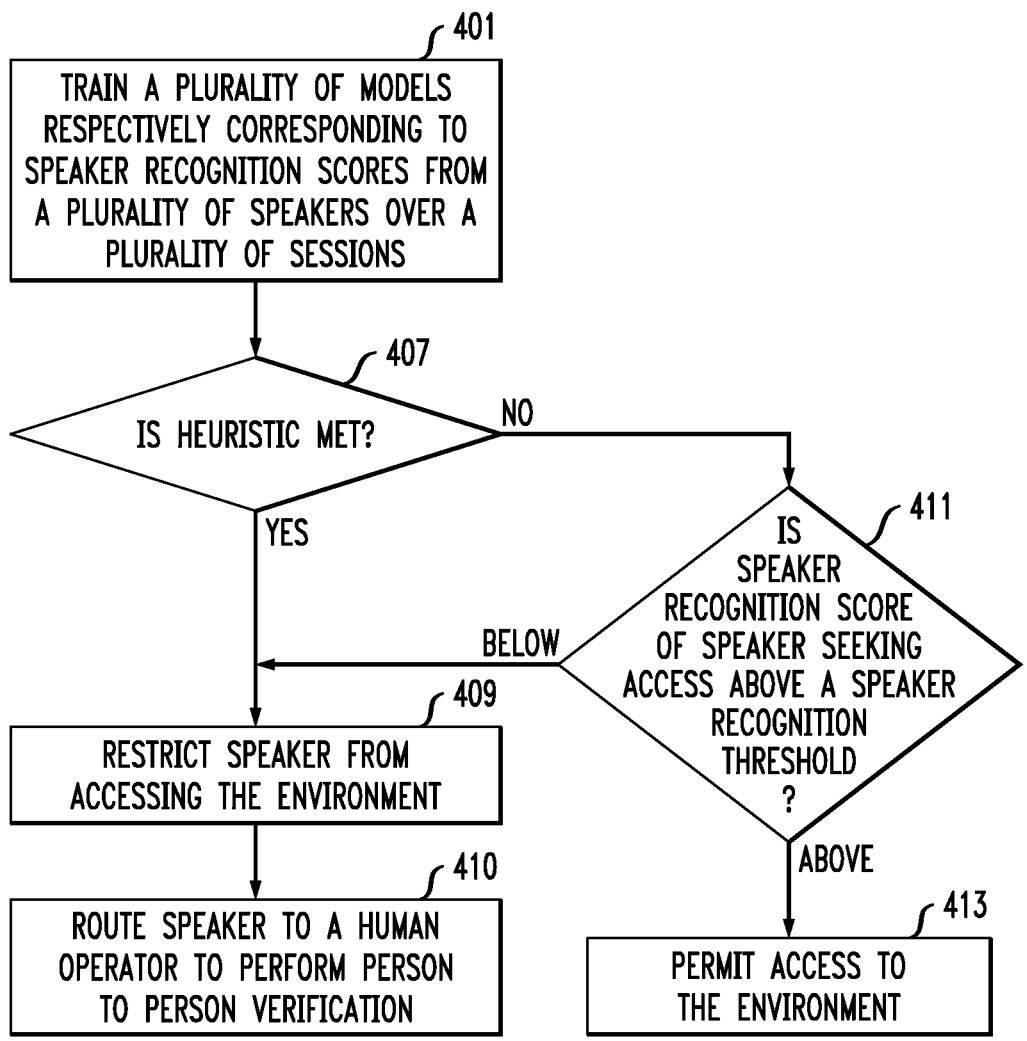
FIG. 4 is a flow diagram of a method for maintaining speaker recognition performance, according to an exemplary embodiment of the invention.

Referring to FIG. 4, which illustrates a method 400 for maintaining speaker recognition performance, in accordance with an embodiment of the present invention, the method is similar to that described in connection with FIG. 1, with the exception that a heuristic approach is used instead of a probabilistic approach. Heuristic can refer to any experience-based technique for problem solving, learning and/or discovery that gives a satisfactory or acceptable solution. While a solution arrived at through a heuristic approach may not necessarily be optimal, whether the solution is satisfactory or acceptable can be based on the requirements of the entity employing the heuristic approach. For example, the level of security required by an entity can determine whether and what heuristic approaches can be used. In some cases, heuristic methods can be used to speed up a process of finding a satisfactory solution. Examples of heuristic approaches, include, but are not limited to, using a rule, or making an educated guess based on certain criteria.

At block 401, a plurality of models respectively corresponding to speaker recognition scores from a plurality of speakers over a plurality of sessions are trained. The plurality of speakers comprise, for example, known non-ideal target speakers, known non-ideal non-target speakers, ideal target speakers and ideal non-target speakers.

At block 407, a heuristic is used to conclude whether a speaker seeking access to an environment should be granted such access, or whether access should be restricted. Specifically, the heuristic may include monitoring speaker recognition scores respectively from a plurality of sessions (e.g., a plurality of call-ins) for a user. The speaker recognition scores can be recorded in, for example, a database. The speaker recognition scores from the plurality of sessions can then be analyzed to determine whether the scores are clustered near a speaker recognition threshold for permitting the user to access an environment. In accordance with an embodiment, "near" may constitute, for example, close to or slightly above or below the speaker recognition threshold. What constitutes close to or slightly above or below the threshold will depend of the system of measurement being used. In accordance with an embodiment, the heuristic may be met or satisfied if a specified number of the scores (e.g., 3 out of 5 scores) are close to the speaker recognition threshold. At block 407, if the heuristic is met (e.g., a specified number of scores that are close to the speaker recognition threshold is reached), the method proceeds to block 409 where the speaker seeking access is restricted from accessing the environment, and to block 410 where the speaker seeking access is routed to a human operator to perform person to person verification. If, at block 407, the heuristic is not met (e.g., a specified number of scores that are close to the speaker recognition threshold is not reached), the method proceeds to block 411 where a speaker recognition score of the speaker seeking access is checked against a speaker recognition threshold, and to block 413 where access to the environment is permitted if the speaker recognition score is above the speaker recognition threshold. If the speaker recognition score is below the speaker recognition threshold, the method proceeds to block 409.

The method may further include grouping the scores according to (a) ideal target trials, (b) ideal non-target (e.g., impostor) trials, (c) non-ideal target (e.g., goats) trials, and (d) non-ideal non-target (e.g., wolves) trials, calculating the likelihood that the user belongs to one of the groups (a), (b), (c) and (d), and calculating the likelihoods of occurrence of each one of the groups (a), (b), (c) and (d). These groupings and the calculations in connection with the groupings are discussed further herein in connection with FIG. 2.

Referring back to FIG. 3, in connection with the method outlined in FIG. 4, the analysis module 303 is capable of running a heuristic used to conclude whether a speaker seeking access to an environment should be granted such access, or whether access should be restricted. In determining whether the heuristic is met, the analysis module 303 is capable of analyzing speaker recognition scores from a plurality of sessions for a user to determine whether and the number of the scores that are clustered near a speaker recognition threshold for permitting the user to access an environment. The scores can be clustered near the speaker recognition threshold when the scores are within a specified range of the speaker recognition threshold.

In accordance with this embodiment, the access module 305 is capable of restricting the user from accessing the environment upon the determination by the analysis module 303 that the heuristic has been met. The access module 305 is also capable of routing the user to a human operator 309 to perform person to person verification upon the determination by the analysis module that the heuristic has been met.

In connection with an embodiment, the system 300 further comprises a grouping module 307 capable of grouping the scores according to (a) ideal target trials, (b) ideal non-target trials, (c) non-ideal target trials, and (d) non-ideal non-target trials. The analysis module 303 calculates the likelihood that the user belongs to one of the groups (a), (b), (c) and (d), and calculates the likelihood of occurrence of each one of the groups (a), (b), (c) and (d).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
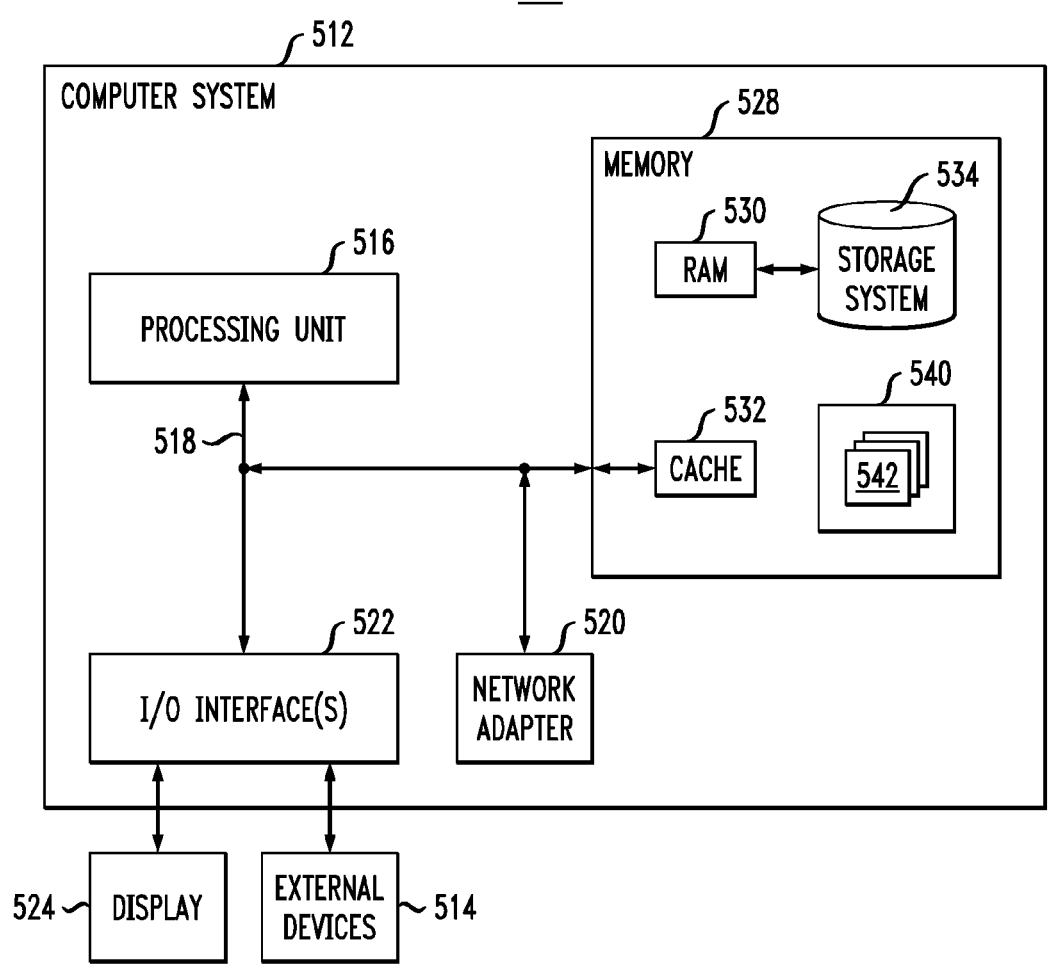
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. For example, while the embodiments of the present invention are described in connection with detection of goats and wolves when using voice recognition, it is also contemplated that the embodiments described herein can be applied to the detection of goats and wolves when using face recognition, fingerprint recognition, eye/periocular based analysis, and other biometric measurements, such as those based on, for example, gait and ear shape.

We claim:

1. A method for maintaining speaker recognition performance, comprising:

training a plurality of models respectively corresponding to speaker recognition scores from a plurality of speakers over a plurality of sessions;

receiving a voice signal of a speaker seeking access to an environment via at least one network;

extracting one or more speech statistics of the voice signal for determining a speaker recognition score of the speaker seeking access;

using the plurality of models to conclude whether the speaker seeking access is a non-ideal target speaker that is authorized to access the environment, but provides a voice signal which yields a speaker recognition score that results in a failure to recognize the non-ideal target speaker as being authorized to access the environment, and prevents access to the environment, or a non-ideal non-target speaker that is not authorized to access the environment, but provides a voice signal which yields a speaker recognition score that results in a misidentification of the non-ideal non-target speaker as being authorized to access the environment, and allows access to the environment, wherein using the plurality of models to conclude comprises:

calculating a first probability that the speaker seeking access is the non-ideal target speaker;

calculating a second probability that the speaker seeking access is the non-ideal non-target speaker; and determining whether the first probability, the second probability or a sum of the first probability and the second probability is above a probability threshold; and restricting the speaker seeking access from accessing the environment upon determining that the first probability, second probability or the sum of the first probability and the second probability is above the probability threshold;

wherein the plurality of speakers comprise known non-ideal target speakers and known non-ideal non-target speakers;

wherein the known non-ideal target speakers comprise authorized speakers each having a right to access the environment and yielding respective first speaker recognition scores within a predetermined value below a speaker recognition threshold that prevent access to the environment;

wherein the known non-ideal non-target speakers comprise unauthorized speakers each not having a right to access the environment and yielding respective second speaker recognition scores within a predetermined value above the speaker recognition threshold that allow access to the environment;

wherein the plurality of speakers further comprise ideal target speakers and ideal non-target speakers;

wherein the ideal target speakers comprise authorized speakers each having a right to access the environment and yielding respective third speaker recognition scores greater than the predetermined value above the speaker recognition threshold that allow access to the environment;

wherein the ideal non-target speakers comprise unauthorized speakers each not having a right to access the environment and yielding respective fourth speaker recognition scores less than the predetermined value below the speaker recognition threshold that prevent access to the environment; and wherein the training, receiving, extracting, using and determining steps are performed by a computer system comprising a memory and at least one processor coupled to the memory.

2. The method according to claim 1, wherein calculating the first and second probabilities comprises using speaker recognition scores for the models corresponding to the known non-ideal target speakers and the known non-ideal non-target speakers.

3. The method according to claim 1, wherein calculating the first probability is performed using the following equation:

$$p(\text{goat}|S) = \frac{P(\text{goat})p(S|\text{goat})}{P(\text{ideal nontarget})p(S|\text{ideal nontarget}) + P(\text{goat})p(S|\text{goat}) + P(\text{wolf})p(S|\text{wolf}) + P(\text{ideal target})p(S|\text{ideal target})}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

4. The method according to claim 3, wherein p(S|goat) is calculated as $$p(S|\text{goat}) = \prod_{i=1}^{N} p(s_i|\text{goat})$$

where N represents a natural number of speaker recognition scores for the known non-ideal target speakers.

5. The method according to claim 1, wherein calculating the second probability is performed using the following equation:

$$p(\text{wolf} \mid S) = \frac{P(\text{wolf})p(S \mid \text{wolf})}{\begin{array}{l}P(\text{ideal nontarget})p(S \mid \text{ideal nontarget}) + \\ P(\text{goat})p(S \mid \text{goat}) + P(\text{wolf})p(S \mid \text{wolf}) + \\ P(\text{ideal target})p(S \mid \text{ideal target})\end{array}}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

6. The method according to claim 5, wherein p (S|wolf) is calculated as $$p(S \mid \text{wolf}) = \prod_{i=1}^{N} p(s_i \mid \text{wolf})$$

where N represents a natural number of speaker recognition scores for the known non-ideal non-target speakers.

7. The method according to claim 1, further comprising routing the speaker seeking access to a human operator to perform person to person verification upon determining that the first probability, second probability or the sum of the first probability and the second probability are above the probability threshold.

8. The method according to claim 1, further comprising checking the speaker recognition score of the speaker seeking access against the speaker recognition threshold upon determining that none of the first probability, second probability and the sum of the first probability and the second probability are above the probability threshold, and permitting access to the environment if the speaker recognition score of the speaker seeking access is above the speaker recognition threshold.

9. A system for maintaining speaker recognition performance, comprising:
a training module capable of training a plurality of models respectively corresponding to speaker recognition scores from a plurality of speakers over a plurality of sessions;
an analysis module capable of:
receiving a voice signal of a speaker seeking access to an environment via at least one network;
extracting one or more speech statistics of the voice signal for determining a speaker recognition score of the speaker seeking access;
using the plurality of models to conclude whether the speaker seeking access is a non-ideal target speaker that is authorized to access the environment, but provides a voice signal which yields a speaker recognition score that results in a failure to recognize the non-ideal target speaker as being authorized to access the environment, and prevents access to the environment, or a non-ideal non-target speaker that is not authorized to access the environment, but provides a voice signal which yields a speaker recognition score that results in a misidentification of the non-ideal non-target speaker as being authorized to access the environment, and allows access to the environment;
calculating a first probability that the speaker seeking access is the non-ideal target speaker;
calculating a second probability that the speaker seeking access is the non-ideal non-target speaker; and
determining whether the first probability, the second probability or a sum of the first probability and the second probability is above a probability threshold; and
an access module capable of restricting the speaker seeking access from accessing the environment upon determining by the analysis module that the first probability, second probability or the sum of the first probability and the second probability is above the probability threshold;
wherein the plurality of speakers comprise known non-ideal target speakers and known non-ideal non-target speakers;
wherein the known non-ideal target speakers comprise authorized speakers each having a right to access the environment and yielding respective first speaker recognition scores within a predetermined value below a speaker recognition threshold that prevent access to the environment;
wherein the known non-ideal non-target speakers comprise unauthorized speakers each not having a right to access the environment and yielding respective second speaker recognition scores within a predetermined value above the speaker recognition threshold that allow access to the environment;
wherein the plurality of speakers further comprise ideal target speakers and ideal non-target speakers;
wherein the ideal target speakers comprise authorized speakers each having a right to access the environment and yielding respective third speaker recognition scores greater than the predetermined value above the speaker recognition threshold that allow access to the environment; and
wherein the ideal non-target speakers comprise unauthorized speakers each not having a right to access the environment and yielding respective fourth speaker recognition scores less than the predetermined value below the speaker recognition threshold that prevent access to the environment.

10. The system according to claim 9, wherein the analysis module is further capable of calculating the first and second probabilities by using speaker recognition scores for the models corresponding to the known non-ideal target speakers and the known non-ideal non-target speakers.

11. The system according to claim 9, wherein the analysis module is further capable of calculating the first probability using the following equation:

$$p(\text{goat} \mid S) = \frac{P(\text{goat})p(S \mid \text{goat})}{\begin{array}{l}P(\text{ideal nontarget})p(S \mid \text{ideal nontarget}) + \\ P(\text{goat})p(S \mid \text{goat}) + P(\text{wolf})p(S \mid \text{wolf}) + \\ P(\text{ideal target})p(S \mid \text{ideal target})\end{array}}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

12. The system according to claim 11, wherein p(S|goat) is calculated as $$p(S \mid \text{goat}) = \prod_{i=1}^{N} p(s_i \mid \text{goat})$$

where N represents a natural number of speaker recognition scores for the known non-ideal target speakers.

13. The system according to claim 9, wherein the analysis module is further capable of calculating the second probability using the following equation:

$$p(\text{wolf} \mid S) = \frac{P(\text{wolf})p(S \mid \text{wolf})}{\begin{array}{c}P(\text{ideal nontarget})p(S \mid \text{ideal nontarget}) + \\ P(\text{goat})p(S \mid \text{goat}) + P(\text{wolf})p(S \mid \text{wolf}) + \\ P(\text{ideal target})p(S \mid \text{ideal target})\end{array}}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

14. The system according to claim 9, wherein the access module is further capable of routing the speaker seeking access to a human operator to perform person to person verification upon determining by the analysis module that the first probability, second probability or the sum of the first probability and the second probability are above the probability threshold.

15. The system according to claim 9, wherein:
the analysis module is further capable of checking the speaker recognition score of the speaker seeking access against the speaker recognition threshold upon determining that none of the first probability, second probability and the sum of the first probability and the second probability are above the probability threshold; and
the access module is further capable of permitting access to the environment if the speaker recognition score of the speaker seeking access is above the speaker recognition threshold.

16. A computer program product for maintaining speaker recognition performance, the computer program product comprising a computer readable storage medium having program instructions embodied therewith, the program instructions executable by a processor to cause the processor to perform a method comprising:
training a plurality of models respectively corresponding to speaker recognition scores from a plurality of speakers over a plurality of sessions;
receiving a voice signal of a speaker seeking access to an environment via at least one network;
extracting one or more speech statistics of the voice signal for determining a speaker recognition score of the speaker seeking access;
using the plurality of models to detect whether the speaker seeking access is a non-ideal target speaker that is authorized to access the environment, but provides a voice signal which yields a speaker recognition score that results in a failure to recognize the non-ideal target speaker as being authorized to access the environment, and prevents access to the environment, or a non-ideal non-target speaker that is not authorized to access the environment, but provides a voice signal which yields a speaker recognition score that results in a misidentification of the non-ideal non-target speaker as being authorized to access the environment, and allows access to the environment, wherein using the plurality of models comprises:
calculating a first probability that the speaker seeking access is the non-ideal target speaker;
calculating a second probability that the speaker seeking access is the non-ideal non-target speaker; and
determining whether the first probability, the second probability or a sum of the first probability and the second probability is above a probability threshold; and
restricting the speaker seeking access from accessing the environment upon determining that the first probability, second probability or the sum of the first probability and the second probability is above the probability threshold;
wherein the plurality of speakers comprise known non-ideal target speakers and known non-ideal non-target speakers;
wherein the known non-ideal target speakers comprise authorized speakers each having a right to access the environment and yielding respective first speaker recognition scores within a predetermined value below a speaker recognition threshold that prevent access to the environment;
wherein the known non-ideal non-target speakers comprise unauthorized speakers each not having a right to access the environment and yielding respective second speaker recognition scores within a predetermined value above the speaker recognition threshold that allow access to the environment;
wherein the plurality of speakers further comprise ideal target speakers and ideal non-target speakers;
wherein the ideal target speakers comprise authorized speakers each having a right to access the environment and yielding respective third speaker recognition scores greater than the predetermined value above the speaker recognition threshold that allow access to the environment; and
wherein the ideal non-target speakers comprise unauthorized speakers each not having a right to access the environment and yielding respective fourth speaker recognition scores less than the predetermined value below the speaker recognition threshold that prevent access to the environment.

17. The computer program product according to claim 16, wherein calculating the first probability is performed using the following equation:

$$p(\text{goat} \mid S) = \frac{P(\text{goat})p(S \mid \text{goat})}{\begin{array}{c}P(\text{ideal nontarget})p(S \mid \text{ideal nontarget}) + \\ P(\text{goat})p(S \mid \text{goat}) + P(\text{wolf})p(S \mid \text{wolf}) + \\ P(\text{ideal target})p(S \mid \text{ideal target})\end{array}}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

18. The computer program product according to claim 17, wherein p(S|goat) is calculated as $$p(S \mid \text{goat}) = \prod_{i=1}^{N} p(s_i \mid \text{goat})$$

where N represents a natural number of speaker recognition scores for the known non-ideal target speakers.

19. The computer program product according to claim 16, wherein calculating the second probability is performed using the following equation:

$$p(\text{wolf} \mid S) = \frac{P(\text{wolf})p(S \mid \text{wolf})}{P(\text{ideal nontarget})p(S \mid \text{ideal nontarget}) + P(\text{goat})p(S \mid \text{goat}) + P(\text{wolf})p(S \mid \text{wolf}) + P(\text{ideal target})p(S \mid \text{ideal target})}$$

where P(ideal nontarget) is a prior probability of an ideal non-target speaker, P(goat) is a prior probability of a non-ideal target speaker, P(wolf) is a prior probability of a non-ideal non-target speaker, and P(ideal target) is a prior probability of an ideal target speaker.

20. The computer program product according to claim 19, wherein p(S|wolf) is calculated as $$p(S \mid \text{wolf}) = \prod_{i=1}^{N} p(s_i \mid \text{wolf})$$

where N represents a natural number of speaker recognition scores for the known non-ideal non-target speakers.

* * * * *